(12) United States Patent
Kajiya et al.

(10) Patent No.: US 9,195,105 B2
(45) Date of Patent: *Nov. 24, 2015

(54) LIQUID CRYSTAL DISPLAY (LCD)

(71) Applicant: Microsoft Technology Licensing, LLC, Redmond, WA (US)

(72) Inventors: James T. Kajiya, Duvall, WA (US); John Turner Whitted, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/265,304

(22) Filed: Apr. 29, 2014

(65) Prior Publication Data
US 2014/0293210 A1  Oct. 2, 2014

Related U.S. Application Data

(63) Continuation of application No. 13/561,619, filed on Jul. 30, 2012, now Pat. No. 8,736,802, and a continuation of application No. 12/821,638, filed on Jun. 23, 2010, now Pat. No. 8,253,914.

(51) Int. Cl.
*G02F 1/1345* (2006.01)
*G02F 1/1343* (2006.01)
*G02F 1/1335* (2006.01)

(52) U.S. Cl.
CPC ........ *G02F 1/13452* (2013.01); *G02F 1/13439* (2013.01); *G02F 1/13454* (2013.01); *G02F 1/133504* (2013.01); *G02F 1/133603* (2013.01); *G02F 2001/13456* (2013.01); *G02F 2001/133567* (2013.01); *G02F 2201/42* (2013.01); *Y10T 29/49165* (2015.01)

(58) Field of Classification Search
CPC  G02F 1/13452; G02F 1/1345; G02F 1/13454
USPC .................................................. 349/149–152
See application file for complete search history.

(56) References Cited

U.S. PATENT DOCUMENTS 8,736,802 B2 *  5/2014  Kajiya et al. .................. 349/152

* cited by examiner

*Primary Examiner* — Phu Vu
(74) *Attorney, Agent, or Firm* — Alin Corie; Sandy Swain; Micky Minhas (57) ABSTRACT

A liquid crystal display (LCD) is provided that comprises a rearward LCD substrate sheet that has an array of vias formed, where the vias provide electrical conduction between both sides of the rearward LCD substrate sheet. The number of vias in the array is substantially equal to or at least equivalent to a combination of a number of column drive lines and a number of row drive lines. The respective drive lines are connected to a corresponding via, such as on one side of the rearward LCD substrate sheet, and respective patterned conductors are connected to a corresponding via, such as on the other side of the rearward LCD substrate sheet. The patterned conductors provide a connection between respective drive lines and one or more corresponding drivers. In one example, this allows a "full bleed" display to be generated.

20 Claims, 7 Drawing Sheets

LIQUID CRYSTAL DISPLAY (LCD)

RELATED APPLICATION

This application is a continuation of U.S. application Ser. No. 13/561,619, filed on Jul. 30, 2012, entitled "LIQUID CRYSTAL DISPLAY (LCD)," and/or U.S. application Ser. No. 12/821,638, filed on Jun. 23, 2010, entitled "LIQUID CRYSTAL DISPLAY (LCD)," at least some of which may be incorporated herein.

BACKGROUND

A liquid Crystal Display (LCD) is a thin, flat dynamic display that uses liquid crystals (LCs) to modulate light emitted from a light source, typically from a backlighting component. LCDs are widely used in a variety of applications including: televisions, monitors (e.g., computer monitors), device instrument panels (e.g., clocks, games, calculators, and detectors), vehicle displays, telephones, portable media players, signage, etc. They are particularly useful in small consumer electronics, but have also found great commercial success in large display systems. LCDs have displaced cathode ray tube (CRT) displays in most applications, as they are usually more compact, lightweight, portable, and affordable.

To provide a general background, LCDs systems typically comprise a backlighting unit, comprising cold cathode fluorescent lights (CFLs) or light emitting diodes (LEDs), which provide the light for the LCD. The LCD itself often comprises layers of thin film transistors (TFTs), electrodes, capacitors, spacers and liquid crystals (LCs) sandwiched between layers of glass or some clear polymer. Further, the "sandwich" can be layered with alignment film that facilitates in modulating (e.g., aligning) the LCs during operation. Additionally, a matrix layer comprises RGB filters that provide color, and cross axis polarizing filters are added to the front and back of the LCD to either block or allow light to pass.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Conventional LCD systems employ backlighting that uses one or more cold cathode fluorescent lights (CFLs) and one or more waveguide plates to distribute light along a back of the LCD. This type of back lighting design is disposed in a manner in the system such that it extends beyond the edges of the LCD, thereby necessitating a cover that extends beyond the edges of the LCD. Further, driver electronics that provide a signal to the interior surface of the LCD (e.g., to row and column electrodes that intersect at pixels) have conductors (e.g., wires) that are routed around the edge of the rear sheet (e.g., glass or polymer sheet layer) to connect with drive lines inside the LCD. Therefore, because these conductors are exposed around one or more edges of the LCD, a cover or bezel is needed for protection and aesthetics.

Among other things, one or more techniques and/or systems are disclosed that can be used to create a "full bleed" display, for example, where an entire front surface of an LCD system (e.g., monitor or television) comprises an active display surface, with no bezel or frame. A "full bleed" display can comprise a display surface that has an active display surface from edge to edge. Previously, systems have claimed to be "borderless," however, these systems merely provide a substantially seamless joint between a bezel and a display area. The techniques and systems, disclosed herein, can provide for seamless (e.g., without bezel or frame) integration of multiple displays, for example, to create a tiled display surface of a plurality of "full bleed" displays.

In one embodiment of an LCD, a rearward (e.g., where a front comprises a viewing front of the LCD) LCD substrate sheet comprises an array of vias, which are formed through the rearward LCD substrate sheet, in order to provide electrical conduction (e.g., for a signal) between a driver side of the rearward LCD substrate sheet and a drive line side of the rearward LCD substrate sheet. A number of vias in the array of vias is substantially equal to or at least equivalent to a combined number of column drive lines and a number of row drive lines. Respective drive lines are connected to a corresponding via at the drive line side of the rearward LCD substrate sheet; and respective patterned conductors are connected to a corresponding via at the driver side of the rearward LCD substrate sheet. Here, in this example, the patterned conductors are configured to connect a drive line to a driver, where multiple drive lines may be connected to the same driver.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figure 1A:
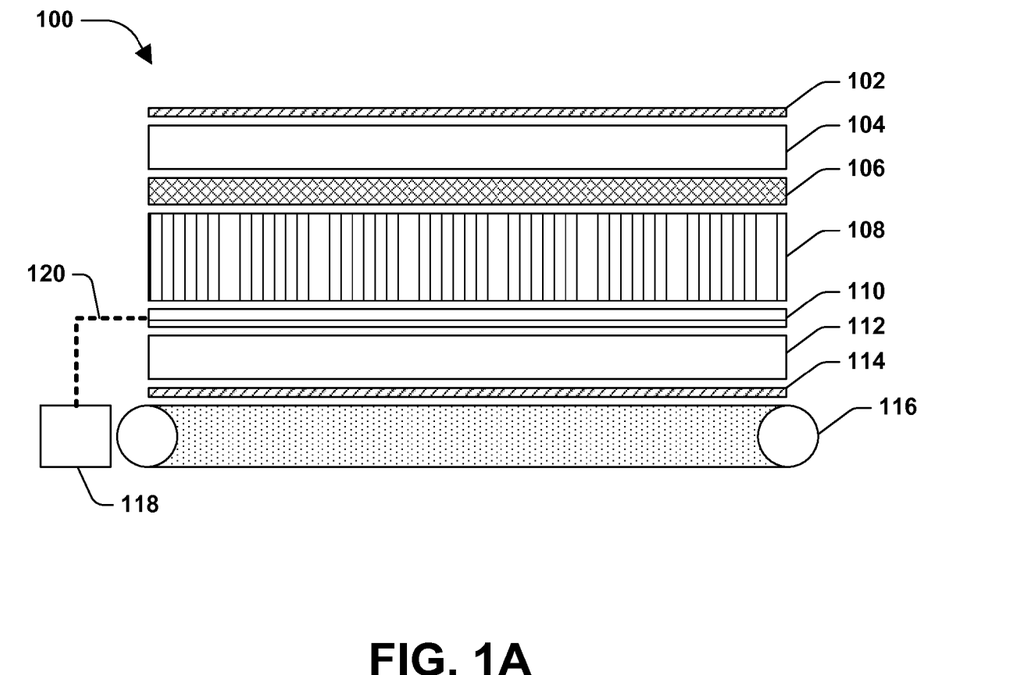
FIGS. 1A and 1B are component diagrams illustrating example embodiments of current liquid crystal display (LCD) system designs.
Figure 1B:
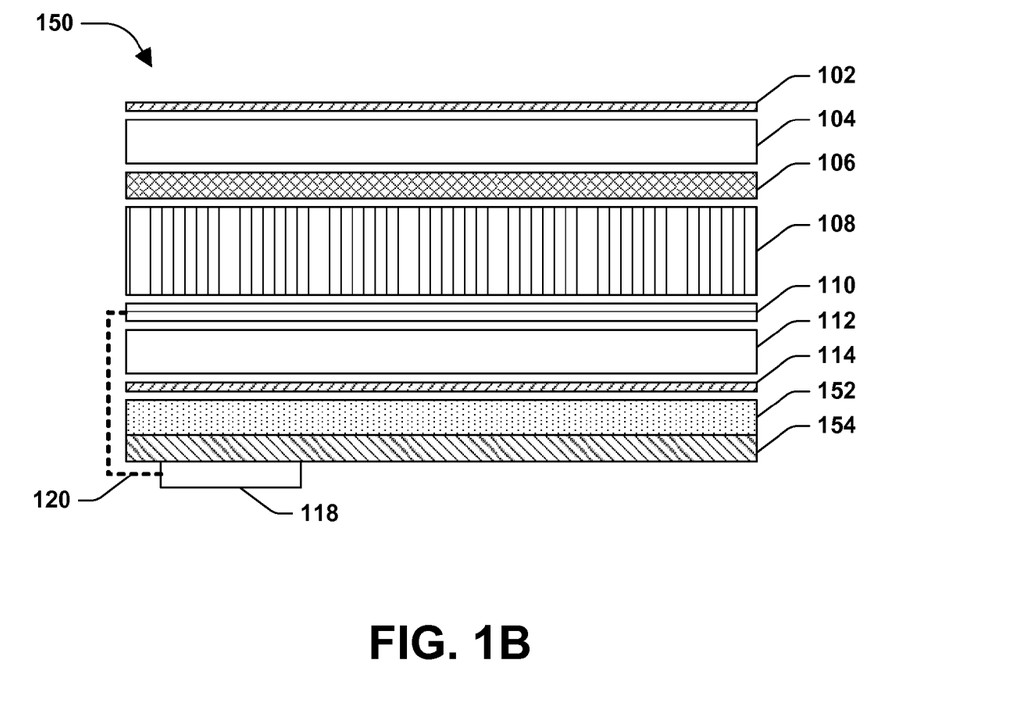

FIGS. 1A and 1B are component diagrams illustrating example embodiments 100 and 150 of current liquid crystal display (LCD) system designs. In the example embodiment 100 the LCD comprises front 102 and rear 114 polarizer film layers. LCDs typically use cross-axis polarized layers to block or pass light for creating images on the display. A front (facing a viewing front of the LCD) substrate sheet layer 104 and a rear substrate sheet layer 112 provide a substrate for internal components of the LCD and provide a seal on both sides. Typically, the substrate sheet layers are comprised of glass or a clear polymer, depending on a size and use of the LCD.

A matrix layer 106 can comprise a black matrix film, a color filter pattern, and sometimes a protective film layer. The liquid crystal (LC) layer 108 comprises LCs arranged in a manner so that they align along alignment films on either side of the LCs. The LC layer 108 also comprises spacers, typically made of a clear polymer, that give the LC layer 108 its needed gap for changing an arrangement of the LCs. A drive line layer 110 comprises thin film transistors, horizontal (rows) and vertical (columns) drive lines, pixel capacitors and electrodes. This layer 110 is used to drive pixel activation and alignment of the LCs in the LCD.

The drive lines are connected to driver components 118 at the edge of the LCD, as the connection wires 120 are routed around the rear LCD substrate sheet layer 112. Typically the driver connection wires 120 connect to column drive lines from a top or bottom and to the row drive lines from one side. The routing of the driver connection wires around the substrate sheet layer 112 creates a need for a bezel around LCD monitors (e.g., TVs, screens, computer monitors) to incorporate and protect the driver connection wires 120. Recent designs have reduced an amount of space used for these connections; however, there is a limit to the reduction when using this configuration.

Further, a backlighting component 116 comprises one or more cold-cathode fluorescent lights (CFLs), which may be approximately one eighth of an inch thick in diameter, and run a full length and/r width of the display. The backlighting component 116 can comprise a waveguide plate that provides for light to be distributed along the length and/or width of the display; a prism sheet that orients the light in a parallel manner; and an optical diffuser to help create an even distribution for backlighting. The presence of the CFL lights in this configuration can also lead to a bezel around the edge of the display, for example, as the CFLs typically need to extend past the edges of the display (e.g., to avoid dark or inactive spots at the edges).

The exemplary embodiment 150 of FIG. 1B illustrates an alternate to the example 100. In this embodiment 150, instead of a CFL-based light backlighting component (e.g., 116 of 100) the example display 150 utilizes an array of LEDs 152 to provide backlighting for the LCD. Further, a circuit board 154 (e.g., a printed circuit board (PCB)) provides control for the LED array 152. In this example embodiment 150 the driver control components 118 are disposed at the back of the circuit board 154. This design enables the bezel to be smaller than may be found in the example 100; however, a bezel is still needed to cover the connection wires 120 from the drivers to the drive line layer 110, and thus neither the embodiment 100 or 150 provide a "full bleed" display.

Figure 2:
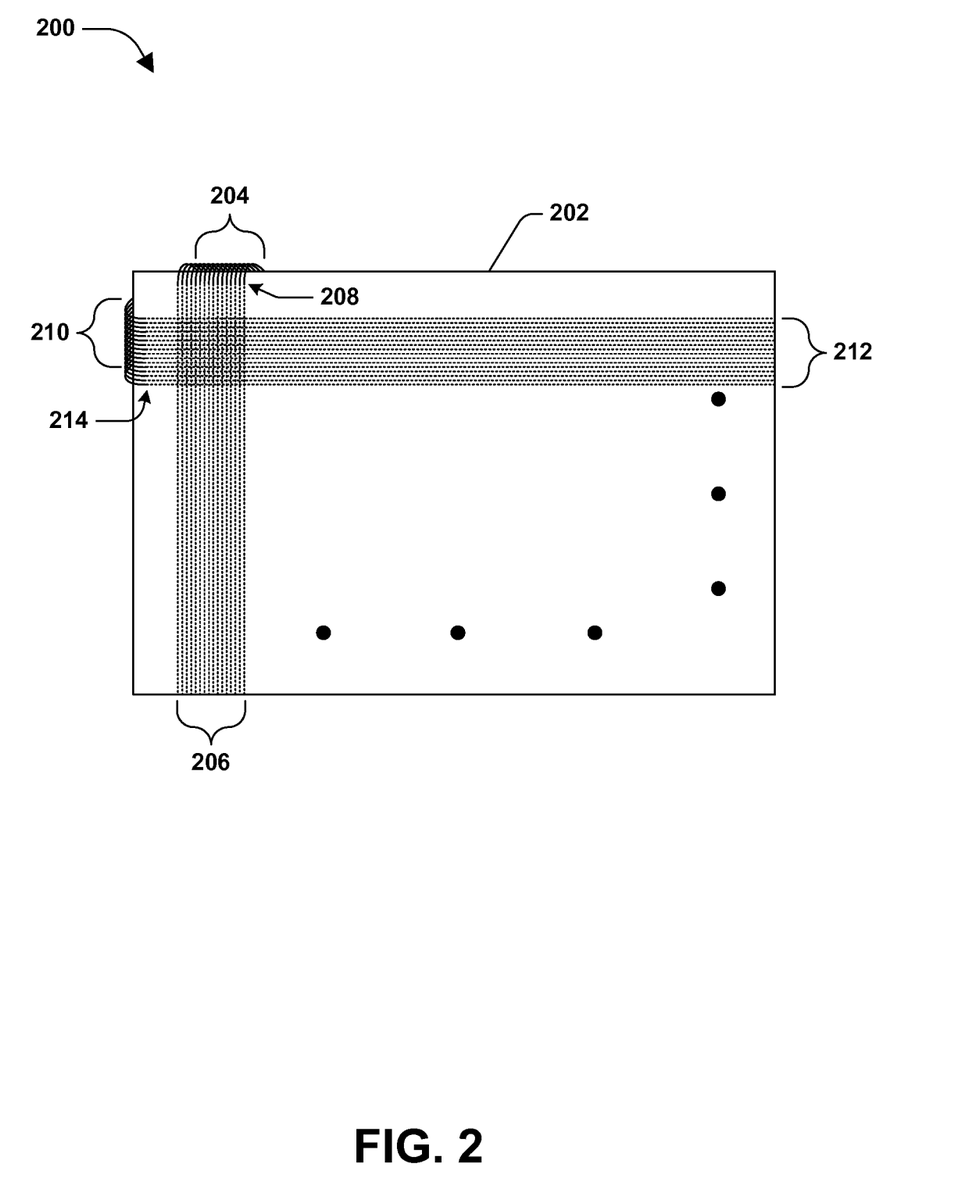
FIG. 2 is a component diagram illustrating another example embodiment of a current LCD system design.

FIG. 2 is a component diagram illustrating another example embodiment 200 of a conventional LCD system design. A drive-line side face (the inside face) of a rear LCD substrate sheet 202 (e.g., comprising glass or a transparent polymer) is shown. In this embodiment 200, column drive line 206 and row drive lines 212 are shown for illustrative purposes; however, typically these components continue across the drive-line face of the rear LCD substrate sheet 202. Driver connections 204 and 210 are routed from behind the rear LCD substrate sheet 202, around its edge, to the drive-line side face. The driver connections 204 and 210 connect at 208 and 214 to column drive lines 206 and row drive lines 212, respectively. As described above, routing the driver connections around the edge of the rear LCD substrate sheet 202 necessitates a bezel at the respective edges to cover the driver connectors 204 and 210, thus preventing a "full bleed" display.

An LCD can be devised that mitigates a need for a bezel around its edges, for example, thereby providing a "full-bleed" display. A "full-bleed" display comprises a display where the front (viewing face) is an active display surface with no area taken up by a frame of bezel around the active display area. That is, for example, an entire front of the display comprises a viewing screen, such that "full bleed" displays can be abutted with no non-active viewing area components (e.g., seams comprising a bezel or frame) between the displays.

Figure 3A:
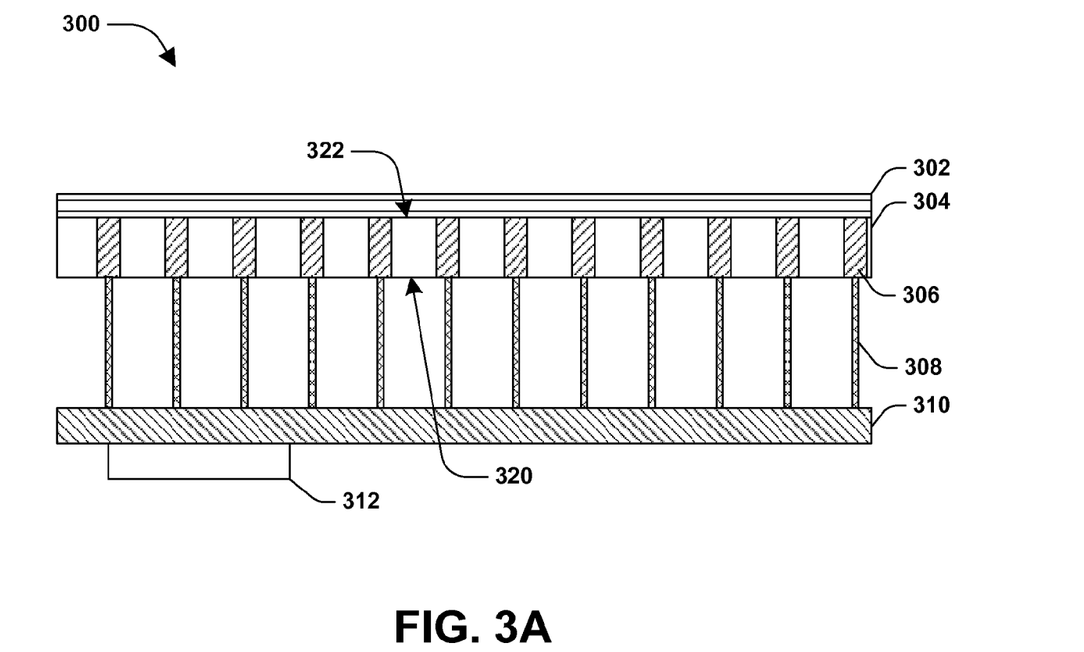
FIGS. 3A and 3B are component diagrams of exemplary portions of a LCD.

FIG. 3A is a component diagram of an exemplary portion of a liquid crystal display 300 (LCD). A rearward LCD substrate sheet 304 comprises an array of vias 306 that are formed to provide electrical conduction between a driver side 320 of the rearward LCD substrate sheet 304 and a drive line side 322 of the rearward LCD substrate sheet 304. The array of vias 306 comprises a number of vias that is substantially equal to or at least equivalent to a combined number of column drive lines and a number of row drive lines.

Figure 3B:
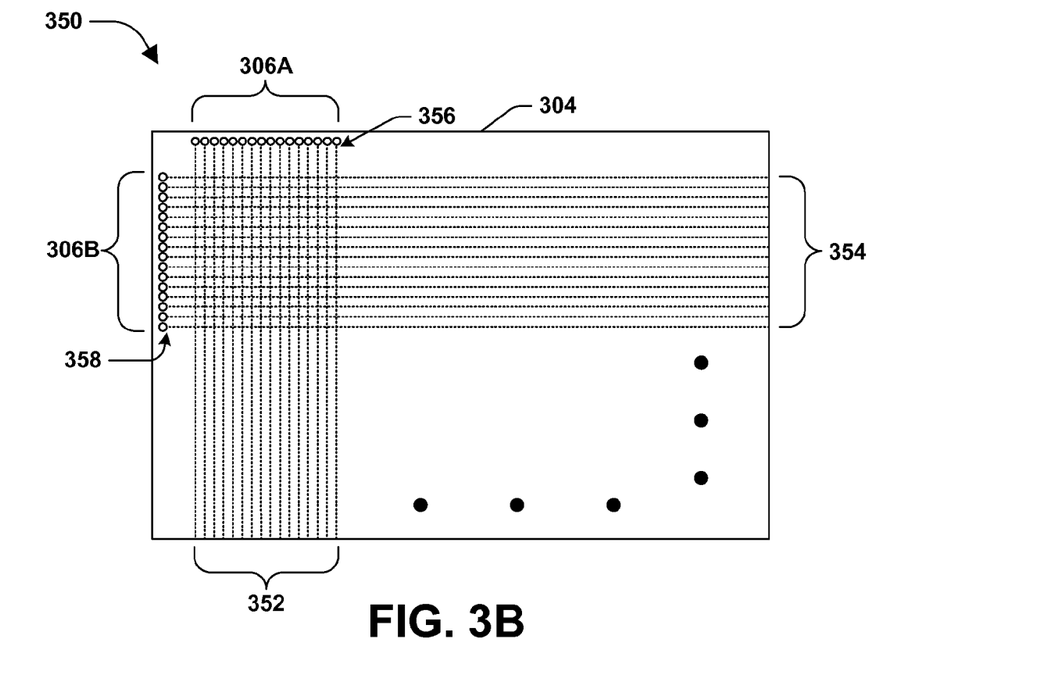

For example, as illustrated in the example embodiment 350 of FIG. 3B, the number of vias in the array of vias 306A and 306B corresponds to the number of column drive lines 352 and row drive lines 354. Further, in this embodiment 350, the vias are formed through the rearward LCD substrate sheet 304, thereby providing an electrical connection, at 356 and 358, between the column drive lines 352 and row drive lines 354, respectively, and the driver side 320 of the rearward LCD substrate sheet 304.

The respective drive lines 352 and 354 are connected 356 and 358 to a corresponding via 306 at the drive line side 322 of the rearward LCD substrate sheet 304. As an example, drive lines can be comprised in a drive-line layer 302, where the drive lines comprise transparent electrodes deposited onto the front of the rearward LCD substrate sheet 304 in lines that are etched onto the sheet. The drive lines conduct a signal from the drivers 312 to respective pixels (not shown) at an intersection of a row drive line 354 and a column drive line 352. In these embodiments 300, 350 the drive lines 352, 354 are connected, at 356 and 358, to the vias 306 instead of driver connections coming around the rearward LCD substrate sheet 304 (e.g., as shown in FIGS. 1A, 1B and 2), thus providing an efficient LCD driver connection that allows for, among other things, a "full bleed" display.

Further, a patterned conductor 308 (e.g., a driver connection) is connected to a corresponding via 306 at the driver side 320 of the rearward LCD substrate sheet 304, for the respective vias 306. Respective patterned conductors 308 connect the drive lines 352 and 354 to a driver 312, using the vias 306, to provide signal conduction between the drive line side 322 and the driver side 320. In one embodiment, a patterned conductor (e.g., 308) comprises an electrode (e.g., wire) that is deposited in a pattern corresponding to a desired connection.

For example, a PCB (e.g., 310) can comprise circuitry configured to control components and functions of the LCD, such as the drivers and backlighting. In this example, the patterned conductors can be deposited onto the PCB in an array corresponding to the array of vias. Further, as an example, the patterned conductors 308 can comprise any material that conducts signals, such as from the drivers 312 to the vias 306, such as copper wire, or a transparent electrode (e.g., transparent conducting oxides, or carbon nanotube conductors). Additionally, respective patterned conductors 308 may be connected to one driver control, or several patterned conductors may be connected to a driver control array, for example; and there may be a plurality of driver control arrays.

Figure 4:
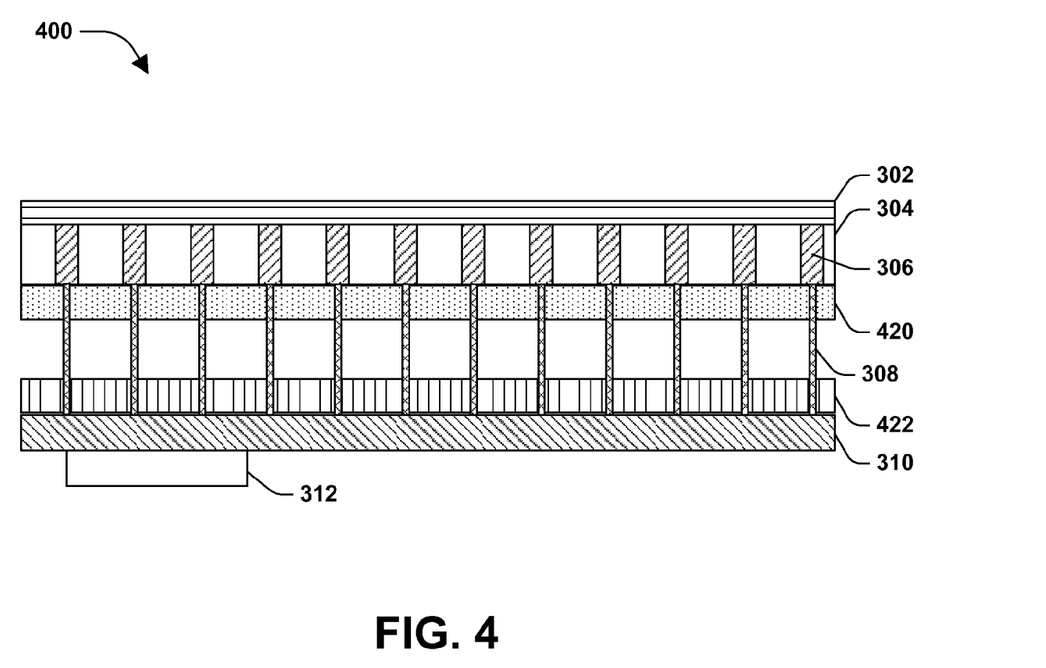
FIG. 4 is a component diagram illustrating an exemplary embodiment of one or more portions of an LCD.

FIG. 4 is a component diagram illustrating an exemplary embodiment 400 of one or more portions of an LCD. In this embodiment 400, an optical diffuser 420 comprises an array of holes that align with the array of vias 306. The array of holes in the optical diffuser 420 can provide access for the patterned conductors 308 to connect to the vias 306. For example, the optical diffuser 420 can have a same arrangement of holes as is formed for the array of vias 306, such as shown in FIG. 3B, and/or is formed for the array of patterned conductors 308. In this way, the patterned conductors 308 will be able to connect to the vias 306 through the optical diffuser 420.

In this embodiment 400, a light source 422 (e.g., an array of LEDs) is disposed between the drivers 312 and the rearward LCD substrate sheet 304. Further, the light source 422 is disposed entirely within a footprint formed by the rearward LCD substrate sheet 304. For example, as described above, the light source can comprise an array of LEDs controlled by the circuit board 310. The light source 422 may comprise several components that provide for light from the LEDs to be directed toward the LCD and diffused appropriately across the LCD, for example. Additionally, in this embodiment, in order to mitigate a need for a bezel or frame around the LCD, the light source 422 fits entirely within the area of the LCD (e.g., does not extend beyond the edges of the LCD).

Figure 5A:
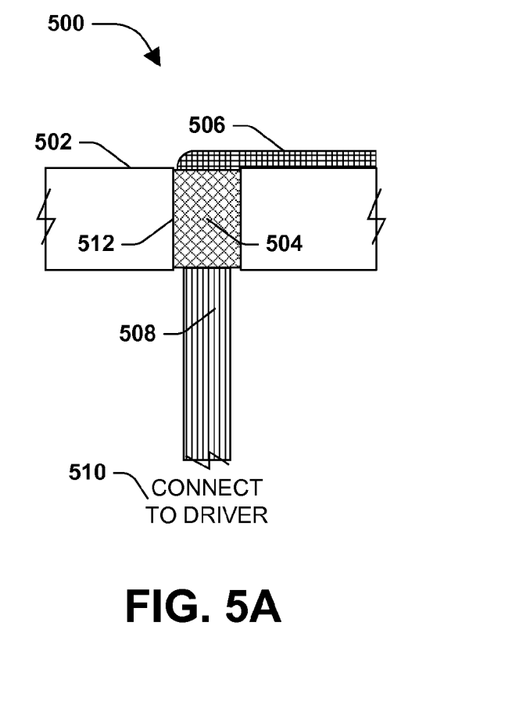
FIGS. 5A and 5B illustrate exemplary embodiments of one or more portions of an LCD.
Figure 5B:
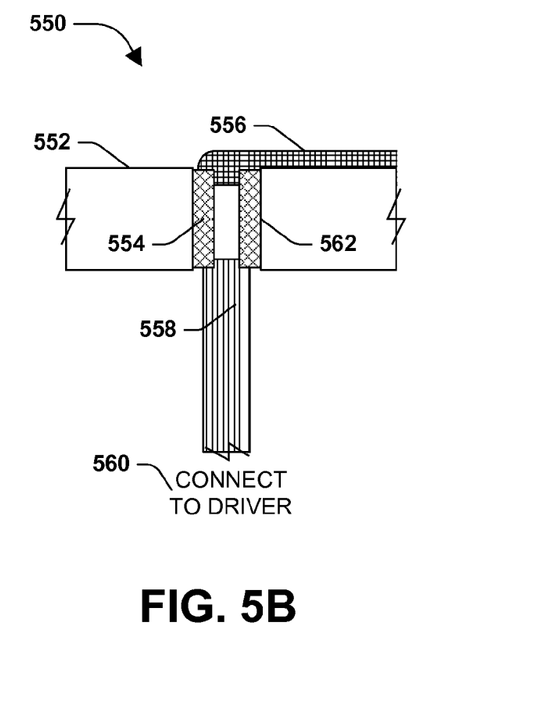

FIGS. 5A and 5B illustrate exemplary embodiments 500 and 550 of one or more portions of an LCD. In the exemplary embodiment 500 of FIG. 5A, the vias comprise a hole 512 formed through the rearward LCD substrate sheet 502, where the conductive material 504 is coating a sidewall of the hole 512 and filling the hole. In this embodiment, for example, a drive line 506 (e.g., column or row drive line) can be deposited on the rearward LCD substrate sheet 502 such that it contacts the conductive material 504 of the via. Further, the patterned conductor 508 can be connected to the conductive material 504 of the via, for example, to provide connection to the driver 510.

In another embodiment 550 of FIG. 5B, the vias comprise a hole 562 formed through the rearward LCD substrate sheet 552, and the conductive material 554 merely coats the sidewall of the hole 562 and does not fill the hole. In this embodiment, for example, the drive line 556 can be deposited on the rearward LCD substrate sheet 502 such that it contacts the conductive material 554 of the via. Further, the patterned conductor 558 can be connected to the conductive material 554 of the via, for example, to provide connection to the driver 560. In this way, in this example, the via provides for signal conduction between both sides of the rearward LCD substrate sheet 552, for example, and a seal is also maintained between both sides.

In one embodiment, the coating of the sidewall of the respective vias can comprise a transparent conducting film (TCF). For example, TCFs can include transparent conducting oxides, such as indium tin oxide (ITO), aluminum doped zinc oxide (AZO), and fluorine doped tin oxide (FTO); and can include conductive polymers. Further, in one embodiment, metallic conductive coatings may be used for the vias. For example, a copper (or some other conductive metal, or metal-based material) film may be applied (e.g., deposited) to the sidewalls of the holes to form the vias.

In one aspect, a length of a drive line (e.g., 352, 354 of FIG. 3B) can affect signal delay, particularly for large LCDs (e.g., large monitors or televisions using large LCDs). For example, the drive lines are typically less than desirable signal conductors, and a signal travelling from the driver connection (e.g., at an edge) along a full length (e.g., across a width or length) of the drive line may experience signal delay. In this aspect, current LCDs can employ merely two drive lines per column or row (e.g., one drive line connected from each side), as the driver connections are routed around the rear LCD sheet layer, as described in FIGS. 1A, 1B and 2.

Given the configuration provided herein, however, in one embodiment, two or more column vias can be used per display column, with respective column vias connected to a column driver. Further, two or more row vias can be used per display row, with respective row vias connected to a row driver. Further, in one embodiment, the two or more vias per display column can be connected to two or more column drive lines per display column; and the two or more vias per display row can be connected to two or more column drive lines per display row.

Figure 6:
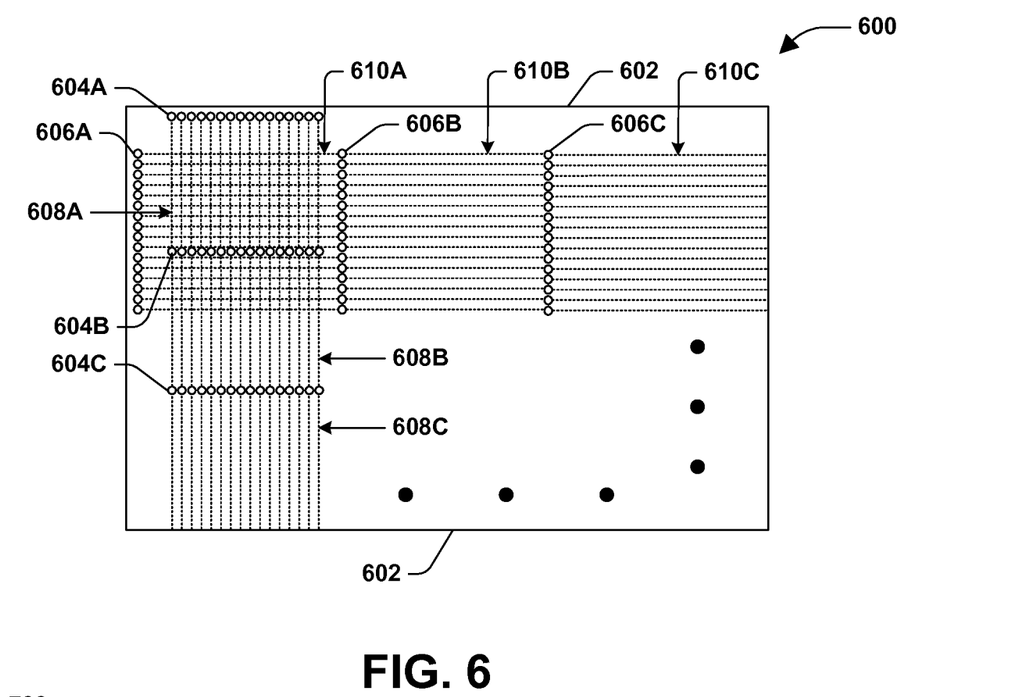
FIG. 6 is a component diagram illustrating another exemplary embodiment of one or more portions of an LCD.

FIG. 6 is a component diagram illustrating another exemplary embodiment 600 of one or more portions of an LCD. In this embodiment 600, the rearward LCD substrate sheet 602 comprises several sets of column vias 604A, 604B, 604C, for example, where the respective display columns comprise three vias (e.g., one of 604A, one of 604B and one of 604C per respective display column). The respective vias 604 are connected to column drive lines 608A, 608B, 608C, for example, where the respective display columns comprise three drive wires (e.g., of shorter length than a full length drive line).

Further, the rearward LCD substrate sheet 602 comprises several sets of row vias 606A, 606B, 606C, for example, where the respective display rows comprise three vias. The respective vias 606 are connected to row drive lines 610A, 610B, 610C, where the respective display rows comprise three drive wires. In this way, for example, each via can be connected to a driver (e.g., one per driver, one set of column or row vias to a driver, and/or a plurality of vias connected to a driver control array), and a signal delay can be mitigated as the respective drive lines are shorter.

Additionally, it will be appreciated that the example embodiment 600 is merely an illustrative example, and that a plurality of sets of vias may be employed. For example, respective display columns and/or display rows may comprise four or more vias and four or more corresponding drive lines per column/row. In this example, the additional vias per column/row can shorten the drive lines even more, thereby providing for improved signal delay (e.g., providing a quicker refresh rate for the LCD).

Figure 7:
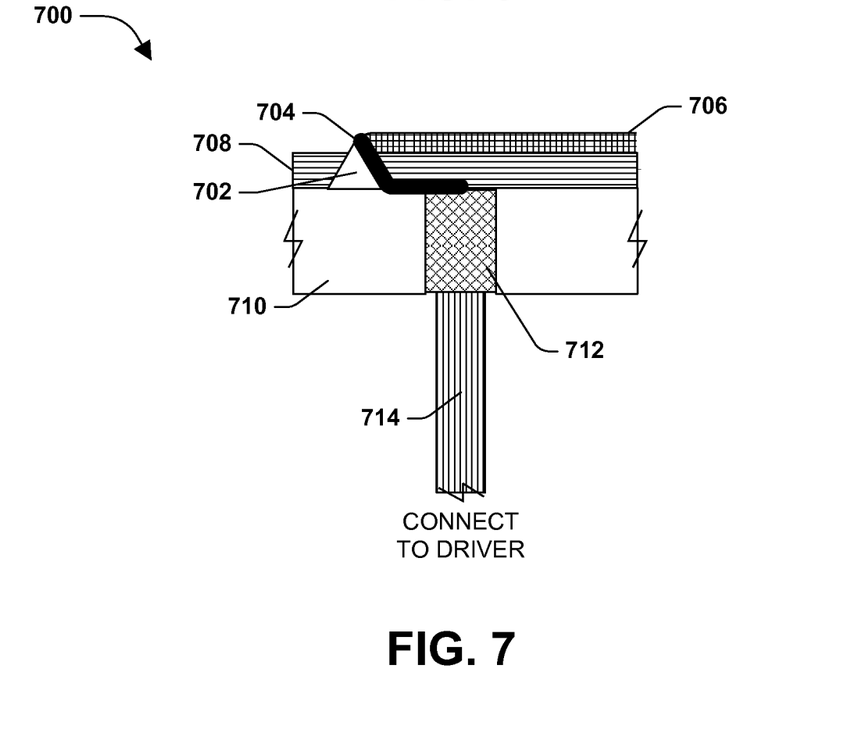
FIG. 7 is a component diagram illustrating another example embodiment of one or more portions of an LCD.

FIG. 7 is a component diagram illustrating another example embodiment 700 of one or more portions of an LCD. In this embodiment, the rearward LCD substrate sheet 710 can comprise an array of column ridges 702 that are formed on the drive line side of the rearward LCD substrate sheet 710. In one embodiment, the respective column ridges 702 are aligned with a corresponding column via 712. A column ridge 702 can provide a substrate location for a patterned connection 704 to pierce an alignment film 708 that is coated on the drive line side of the rearward LCD substrate sheet 710. In this embodiment, this arrangement can provide a connection between the column via 712 and a corresponding column drive line 706.

The patterned conducting connector 704 is disposed along respective column ridges 702, for the rearward LCD substrate sheet 710, connecting the column via 712 with the corresponding column drive line 706 through the alignment film 708. In this way, for example, there is a connection between the column drive line 706 and a patterned connection 714, which connects to the driver, through the alignment film 708.

Figure 8:
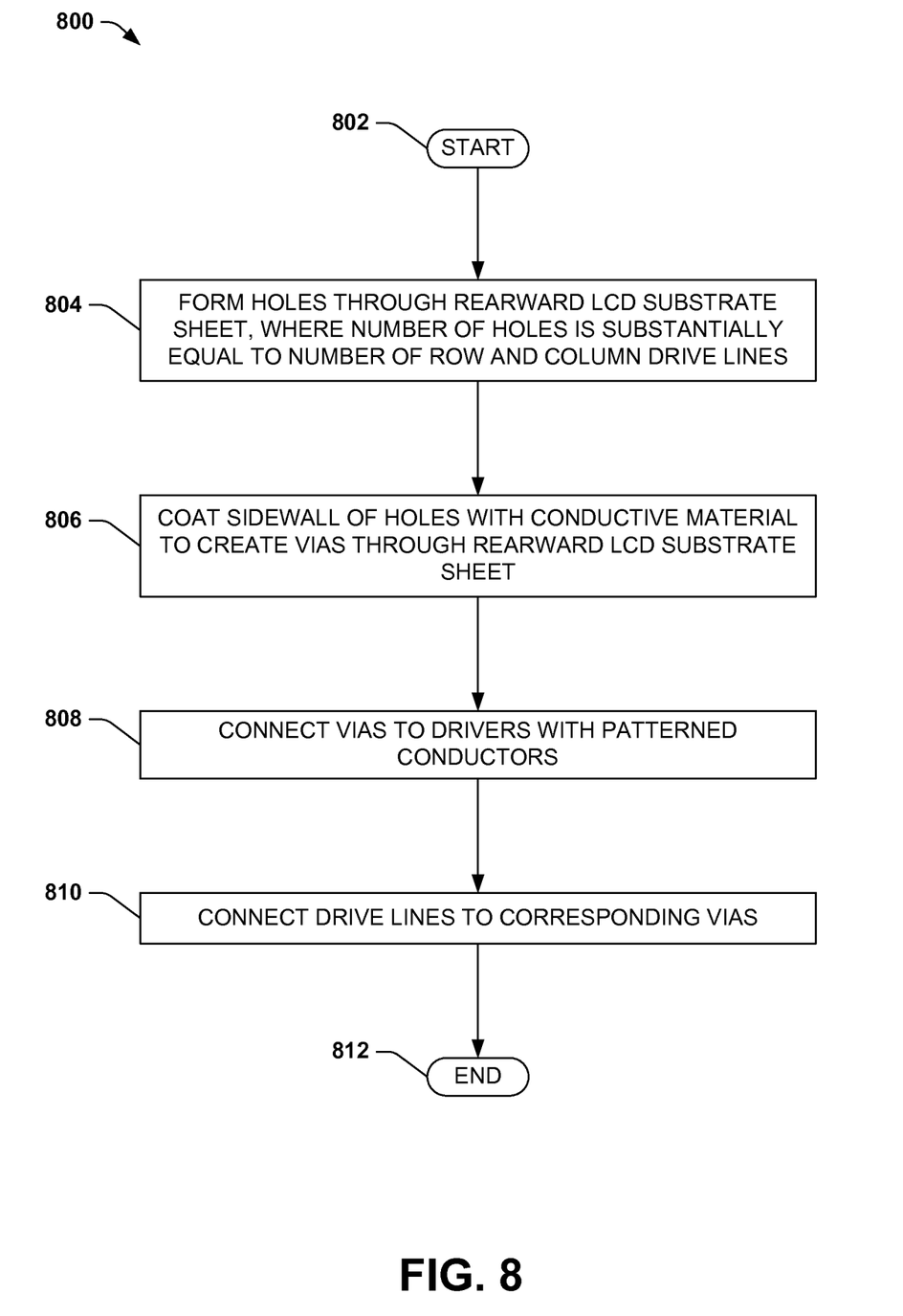
FIG. 8 is a flow diagram of an exemplary method for connecting drivers to drive lines in an LCD.

A method may be devised for manufacturing an LCD, for example, which may provide for a "full bleed" display that comprises a faster refresh rate. FIG. 8 is a flow diagram of an exemplary method 800 for connecting drivers to drive lines in a liquid crystal display (LCD). The exemplary method 800 begins at 802 and involves forming a number of holes through a rearward LCD substrate sheet, at 804, where the number of holes is substantially equal to or at least equal to a combined number of column drive lines and a number of row drive lines. For example, if a number or column drive line comprises one thousand and eighty and a number of row drive lines comprises one thousand nine hundred and twenty, the number of holes formed in the rearward LCD substrate sheet can comprise three thousand. In one example, the holes can be formed utilizing femtosecond laser ablation and/or with a chemical milling process.

At 806, a sidewall of the respective holes is coated with a conductive material in order to create an array of vias through the rearward LCD substrate sheet. For example, a sidewall can be coated with a transparent conducting film, or a metallic conducting material to create a via that provides signal conduction between both sides of the rearward LCD substrate sheet. The techniques, described herein, are not limited to any particular coating method, and it is anticipated that those skilled in the art may devise various techniques for coating the sidewalls of the holes to create vias. For example, the coating material may be deposited on a surface of the rearward LCD substrate sheet and allowed to flow (or be forced) through the holes.

At 808, respective vias are connected to a driver using patterned conductors, and respective drive lines are connected to a corresponding via, at 810. For example, after the vias are formed, the drive lines (e.g., both for a display column and display row) can be deposited, such as by depositing a transparent electrode along grooves etched in a front of the rearward LCD substrate sheet. In this example, the drive lines can be deposited such that they contact the corresponding via, which can be aligned along a groove for the drive lines. Further, in one embodiment, the patterned conductors can have a first connection to the driver(s), such as through a circuit board, and a second connection can be made at corresponding vias.

Having connected the patterned conductors and drive lines to the vias, such as to provide a connection between the patterned conductors and drive lines, the exemplary method 800 ends at 812.

Figure 9:
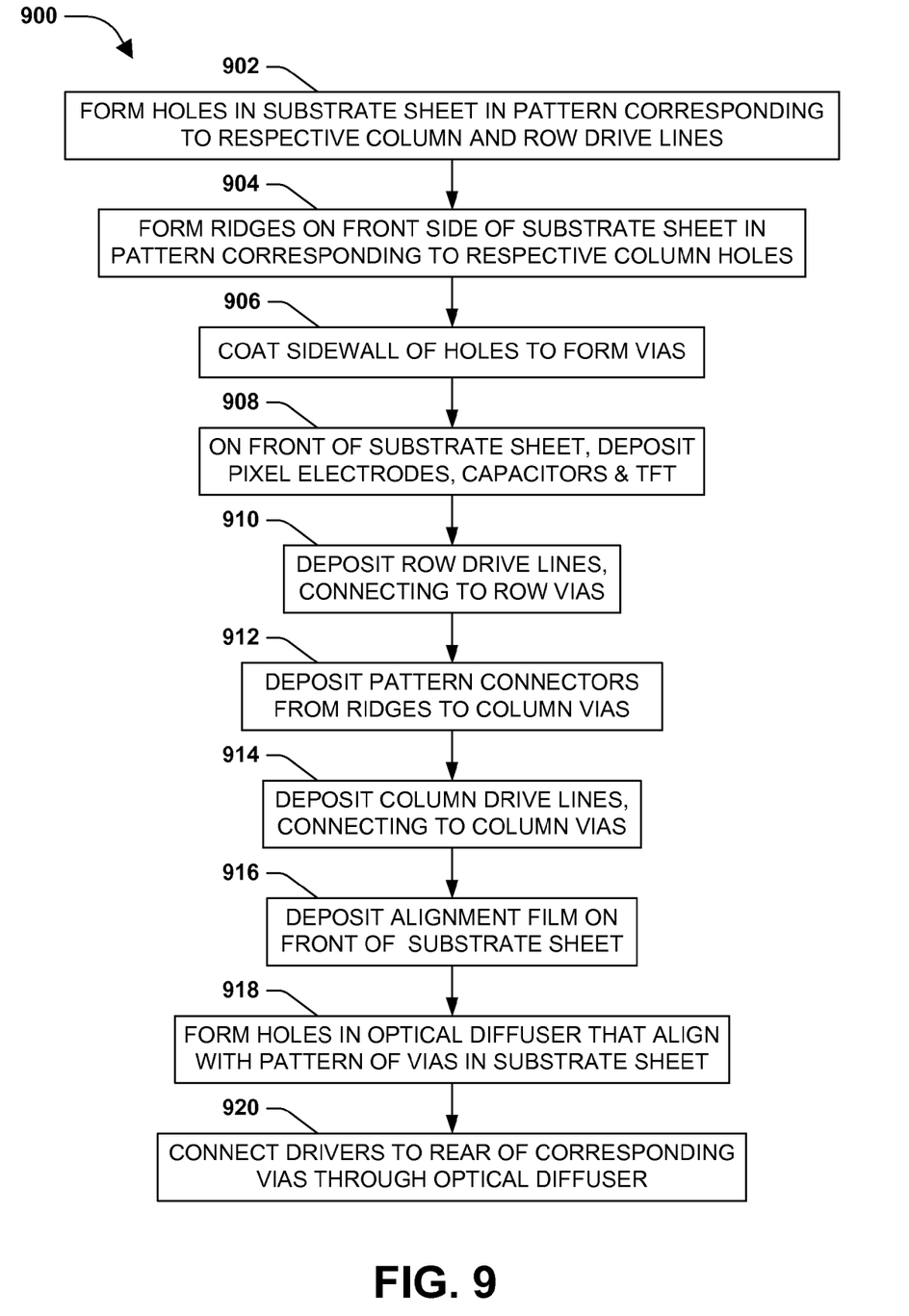
FIG. 9 is a flow diagram illustrating an exemplary embodiment of one or more portions of a method for connecting drivers to drive lines in a LCD.

FIG. 9 is a flow diagram illustrating an exemplary embodiment 900 of one or more portions of a method for connecting drivers to drive lines in a LCD, such as to create a "full bleed" display that has improved refresh rates, for example. At 902, holes are formed in a rearward LCD substrate sheet, into a pattern that corresponds to respective column drive lines and row drive lines. That is, for example, the holes in the substrate sheet can comprise a pattern that aligns with the drive lines, such as in a path of the drive lines (e.g., as in FIGS. 3B and 6).

In one embodiment, a plurality of holes can be formed for respective display columns and/or for respective display rows. For example, in order to have more than one drive line per column and/or row, more than one hole is formed for each of the display columns and/or display rows. In this way, for example, respective drive lines can be shortened, such as to provide for a faster refresh rate, where each drive line in a row or column connects to a driver.

At 904, an array of column ridges are formed on the drive line side of the rearward LCD substrate sheet. In this embodiment, respective column ridges are formed so that they align with a corresponding column via. In this way, a bonding substrate can be provided for a patterned connection (e.g., along the ridge), in order to pierce an alignment film that is coated on the drive line side of the rearward LCD substrate sheet. In this way, in this embodiment, a connection can be made between the corresponding column via and a corresponding column drive line (e.g., as in FIG. 7).

At 906, the sidewalls of the holes formed in the rearward LCD substrate sheet can be coated with a conductive material (e.g., TCF) to form vias, which provide for conducting a signal from one side of the rearward LCD substrate sheet to the other (e.g., instead of going around the rearward LCD sheet). In one embodiment, coating of the sidewall of a hole to form a via can comprise filling the hole. In another embodiment, the coating of the sidewall to form a via may not fill the hole.

At 908, appropriate pixel electrodes, capacitors, and/or thin film transistors (TFTs), for example, can be deposited on the front of the rearward LCD substrate sheet (e.g., to form pixels). At 910, row drive lines are deposited on the front of the rearward LCD substrate sheet, where respective row drive lines are connected to corresponding vias. As described above, in one embodiment, two or more vias can be connected to two or more row drive lines per display row.

At 912, a patterned conducting connection is connected to the column via using the corresponding column ridge. That is, for example, the patterned conducting connection can be deposited along the ridge for a column, where it contacts the corresponding column via. In this way, the patterned conducting connection can provide a connection to a corresponding column drive line. At 914, column drive lines are deposited on the front of the rearward LCD substrate sheet, where respective column drive lines are connected to corresponding vias using the patterned conducting connection deposited along the ridges. As described above, in one embodiment, two or more vias can be connected to two or more column drive lines per display column.

At 916, an alignment film can be deposited on the front of the rearward LCD substrate sheet. As described previously, the alignment film can be used to help in aligning the liquid crystals (LCs). Further, the column ridges are formed to pierce the alignment film in order to provide the connection between the column drive line and the corresponding via, through the patterned conducting connection deposited along the ridge.

At 918, an array of holes can be formed in an optical diffuser, where the array of holes align with the holes (vias) in the rearward LCD substrate sheet. The array of holes in the optical diffuser allow for the patterned conductors, which connect the drivers to the vias, to pass through the optical diffuser. In this way, for example, the optical diffuser can be disposed between a circuit board, comprising the patterned conductors, and the rearward LCD substrate sheet. As described above, the optical diffuser can be used to provide an even distribution of backlighting to the LCD from a backlighting component.

At 920, the drivers are connected to the rear (driver side) of the rearward LCD substrate sheet by connecting the patterned conductors to corresponding vias. For example, a driver control array (e.g., driver electronics) can be disposed on a rear side of a circuit board (e.g., PCB) and the patterned conductors can be connected to the front side circuit board. In one embodiment, as described above, two or more column vias per display column can be connected to a column driver; and two or more row vias per display row can be connected to a row driver, such as to provide multiple drive lines per row and/or column.

In this example, the patterned conductors can be attached to the vias, through a lighting component, through the optical diffuser, and attached to the rear of the rearward LCD substrate sheet. In this way, for example, the LCD can be formed such that connections between the drivers and drive lines do not need to be routed around respective edges of the rearward LCD substrate sheet. Further, in one embodiment, this arrangement can provide for creating a "full bleed" display, where no framing or bezeling is needed around the sides of the LCD display.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A display comprising:
a rearward display substrate sheet comprising a first via and a second via;
a column drive line connected to the first via at a drive line side of the rearward display substrate sheet;
a first conductor connected to the first via at a driver side of the rearward display substrate sheet;
a row drive line connected to the second via at the drive line side of the rearward display substrate sheet; and
a second conductor connected to the second via at the driver side of the rearward display substrate sheet.

2. The display of claim 1, comprising an optical diffuser comprising a hole aligned with at least one of the first via or the second via.

3. The display of claim 2, the hole configured to provide access for at least one of the first conductor or the second conductor to connect to at least one of the first via or the second via.

4. The display of claim 1, at least one of the first via or the second via comprising conductive material coating a sidewall of a hole formed through the rearward display substrate sheet and filling the hole.

5. The display of claim 1, at least one of the first via or the second via comprising conductive material coating a sidewall of a hole formed through the rearward display substrate sheet and not filling the hole.

6. The display of claim 1, a sidewall of at least one of the first via or the second via coated with one or more of:
a transparent conducting film; or
a metallic conducting coating.

7. The display of claim 1, at least one of the first via or the second via comprised in an array of vias comprising a number of vias substantially equivalent to a combination of a number of column drive lines and a number of row drive lines.

8. A method, comprising:
forming a hole through a rearward display substrate sheet;
coating a sidewall of the hole with a conductive material to create a via through the rearward display substrate sheet;
connecting the via to a driver using a conductor; and
connecting a drive line to the via.

9. The method of claim 8, the hole comprised in a set of holes comprising a number of holes substantially equal to a combination of a number of column drive lines and a number of row drive lines.

10. The method of claim 8, comprising forming a hole in an optical diffuser that aligns with the hole through the rearward display substrate sheet.

11. The method of claim 10, the hole in the optical diffuser configured to provide for the conductor to pass through the optical diffuser.

12. The method of claim 8, the coating a sidewall comprising one of:
coating the sidewall and filling the hole; or
coating the sidewall and not filling the hole.

13. The method of claim 8, the coating a sidewall comprising coating the sidewall of the hole with a transparent conducting film.

14. The method of claim 8, the coating a sidewall comprising coating the sidewall of the hole with a metallic conducting coating.

15. A computer readable media comprising instructions that when executed, perform a method comprising:
connecting a column drive line to a first via at a drive line side of a rearward display substrate sheet comprising the first via and a second via;
connecting a first conductor to the first via at a driver side of the rearward display substrate sheet;
connecting a row drive line to the second via at the drive line side of the rearward display substrate sheet; and
connecting a second conductor to the second via at the driver side of the rearward display substrate sheet.

16. The computer readable media of claim 15, the method comprising aligning a hole of an optical diffuser with at least one of the first via or the second via.

17. The computer readable media of claim 16, the method comprising providing access, by way of the hole, for at least one of the first conductor or the second conductor to connect to at least one of the first via or the second via.

18. The computer readable media of claim 15, at least one of the first via or the second via comprising conductive material coating a sidewall of a hole formed through the rearward display substrate sheet and filling the hole.

19. The computer readable media of claim 15, at least one of the first via or the second via comprising conductive material coating a sidewall of a hole formed through the rearward display substrate sheet and not filling the hole.

20. The computer readable media of claim 15, the method comprising coating a sidewall of at least one of the first via or the second via with one or more of:
a transparent conducting film; or
a metallic conducting coating.

* * * * *